US011277503B2

(12) United States Patent
Choi et al.

(10) Patent No.: US 11,277,503 B2
(45) Date of Patent: Mar. 15, 2022

(54) MOBILE TERMINAL

(71) Applicant: LG ELECTRONICS INC., Seoul (KR)

(72) Inventors: Hakho Choi, Seoul (KR); Sungdo Kim, Seoul (KR); Ahrah Koh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 134 days.

(21) Appl. No.: 16/870,188

(22) Filed: May 8, 2020

(65) Prior Publication Data

US 2021/0120111 A1 Apr. 22, 2021

(51) Int. Cl.
*H04M 1/00* (2006.01)
*H04M 1/02* (2006.01)
*H05K 5/00* (2006.01)
*G06F 3/045* (2006.01)

(52) U.S. Cl.
CPC .......... *H04M 1/0237* (2013.01); *G06F 3/045* (2013.01); *H04M 1/0268* (2013.01); *H05K 5/0017* (2013.01); *G06F 2203/04102* (2013.01); *H04M 2250/12* (2013.01)

(58) Field of Classification Search
CPC .... G06F 1/1624; G06F 1/1652; G06F 1/1675; G06F 2203/04102; G06F 3/045; G06F 1/1677; H04M 1/0237; H04M 1/0268; H04M 2250/12; H04M 1/0241; H05K 5/0017
See application file for complete search history.

(56) References Cited

U.S. PATENT DOCUMENTS

| | | | | |
|---|---|---|---|---|
| 8,947,269 | B2* | 2/2015 | Jung | H04M 1/23 341/20 |
| 10,481,638 | B2* | 11/2019 | Yoshizumi | H04M 1/0268 |
| 2019/0261519 | A1* | 8/2019 | Park | G02F 1/133305 |
| 2020/0264660 | A1* | 8/2020 | Song | H04M 1/0268 |
| 2020/0409421 | A1* | 12/2020 | Cho | H01L 51/5237 |

FOREIGN PATENT DOCUMENTS

| | | |
|---|---|---|
| KR | 1020060016369 | 2/2006 |
| KR | 1020070028854 | 3/2007 |
| KR | 100803486 | 2/2008 |
| KR | 1020080033010 | 4/2008 |
| KR | 1020190004618 | 1/2019 |

OTHER PUBLICATIONS

PCT International Application No. PCT/KR2019/013723, Notification of Transmittal of The International Search Report and The Written Opinion of the International Searching Authority, or Declaration dated Jul. 16, 2020, 10 pages.

* cited by examiner

*Primary Examiner* — Nhan T Le
(74) *Attorney, Agent, or Firm* — Lee Hong Degerman Kang & Waimey

(57) ABSTRACT

A mobile terminal including a sensing unit for detecting a movement between a first frame and a second frame movable in a first direction or a second direction opposite to the first direction with respect to the first frame may accurately determine a position of the second frame, and may slidably move stably.

10 Claims, 11 Drawing Sheets

FIG. 3
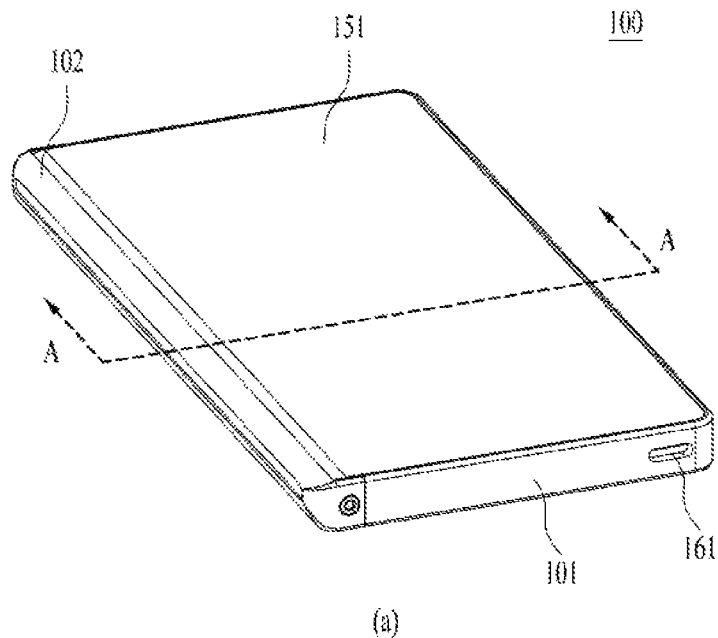
(a)
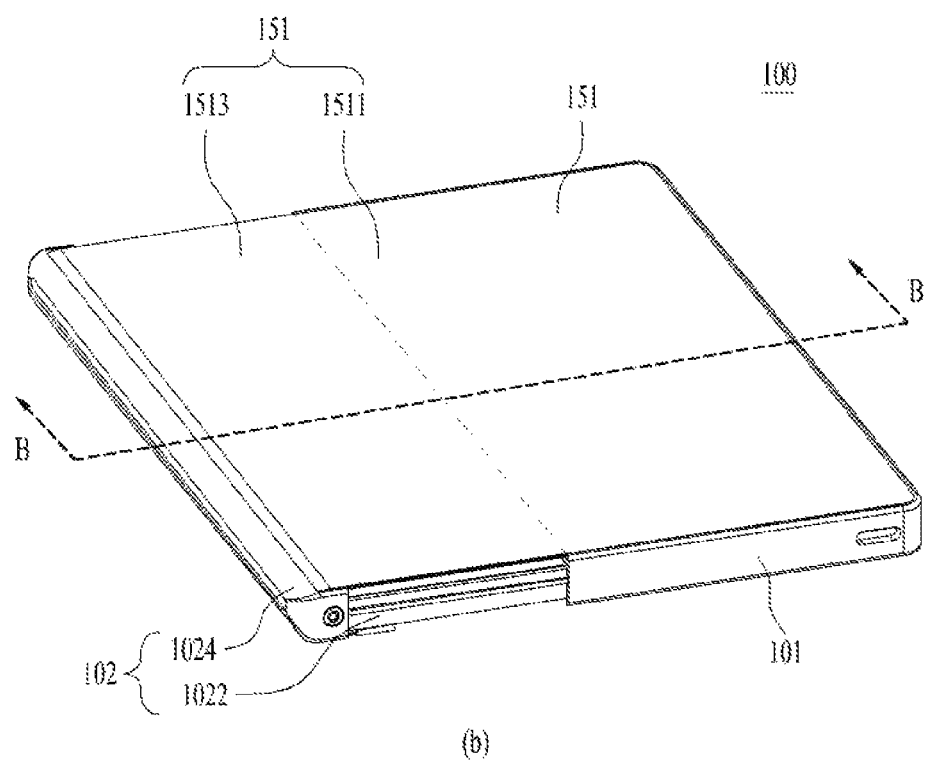
(b)

FIG. 4
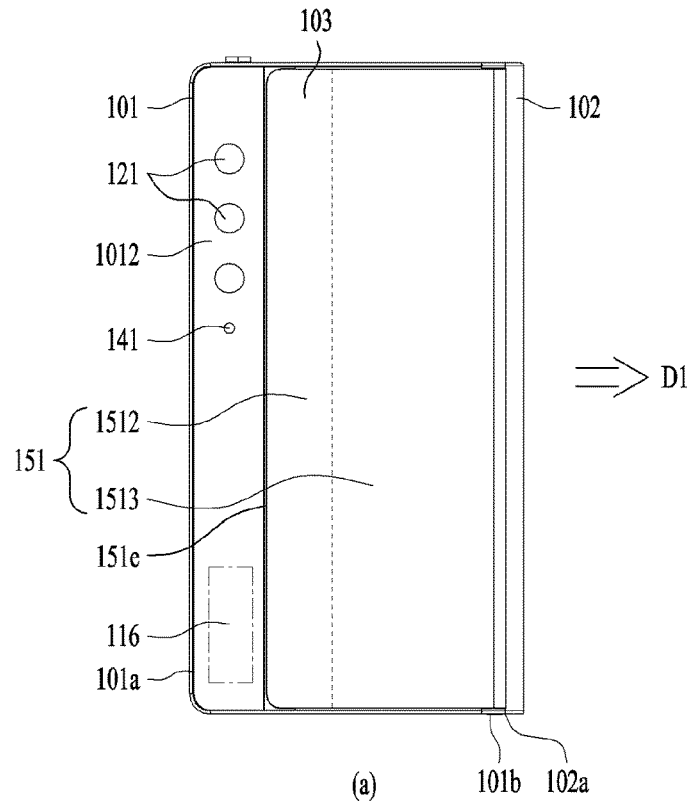
(a)
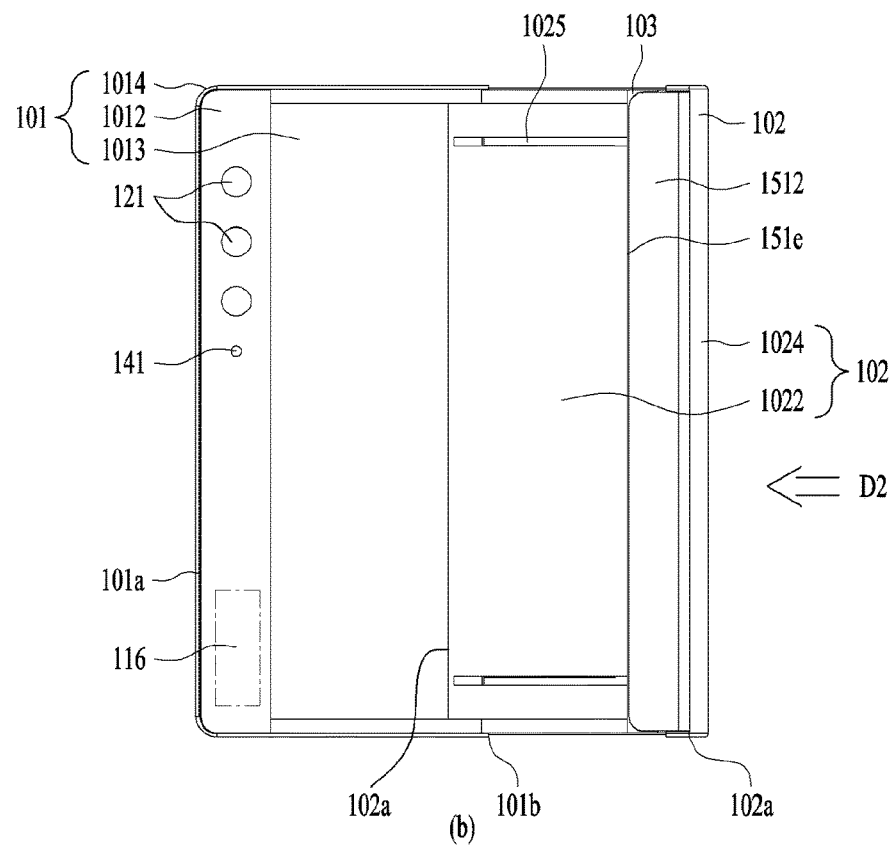
(b)

(a)         (b)

FIG. 9
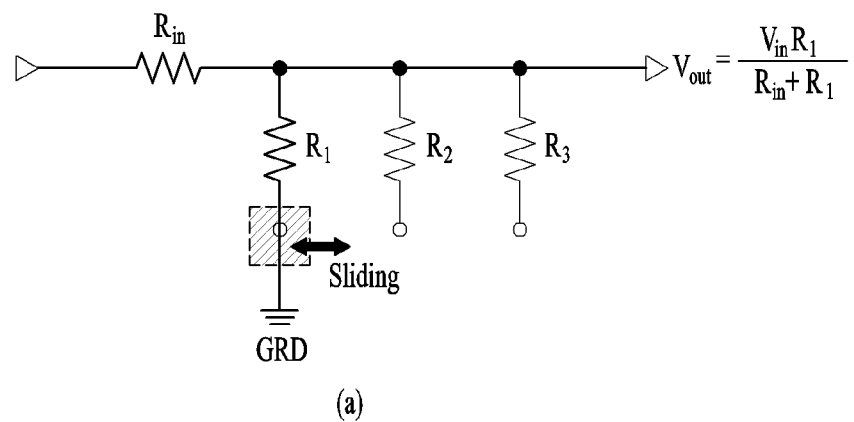
(a)
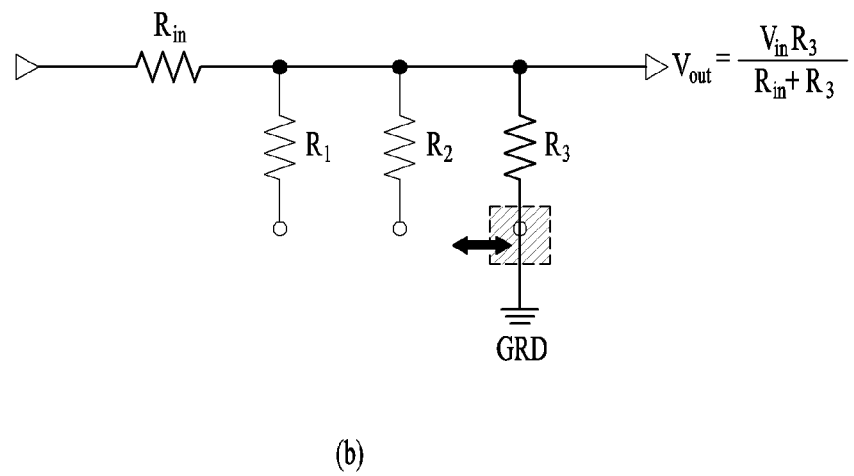
(b)

FIG. 11
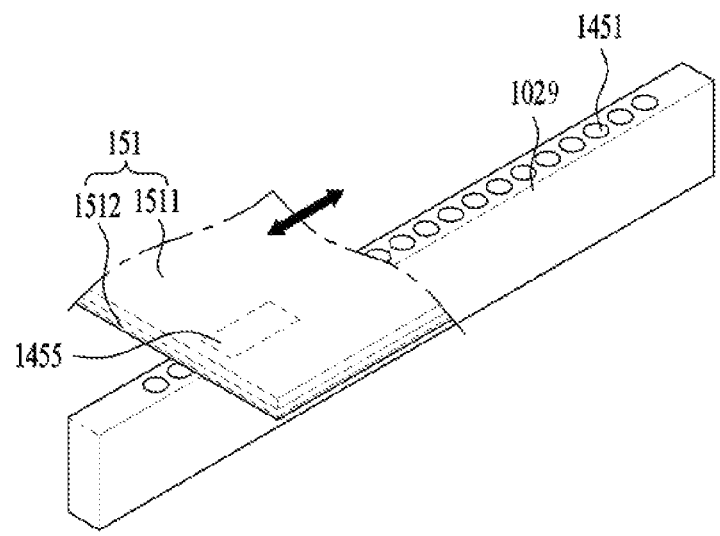
(a)
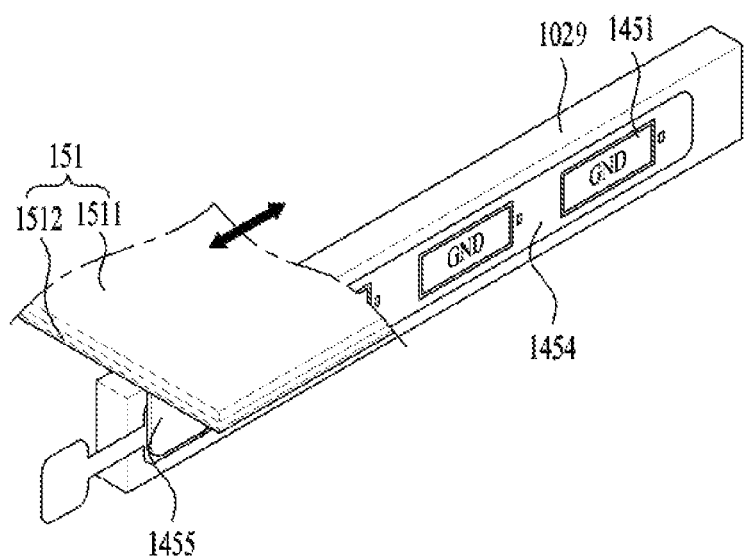
(b)

MOBILE TERMINAL

Pursuant to 35 U.S.C. § 119(a), this application claims the benefit of earlier filing date and right of priority to International Application No. PCT/KR2019/013723, filed on Oct. 18, 2019, the contents of which are all hereby incorporated by reference herein in its entirety.

BACKGROUND

Field

The present disclosure relates to a mobile terminal, more particularly, to a mobile terminal having a flexible display.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device having a function of receiving, processing, and displaying a video that a user may watch. For example, the display device receives a broadcast selected by the user from broadcast signals transmitted from a broadcasting station, separates a video signal from the received signals, and displays the separated video signal on a display.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with an ubiquitous computing environment. In other words, the display device has evolved into a smart device that enables connectivity to a network and continuous computing.

Recently, a flexible display, which has sufficient elasticity, and thus, be able to be deformed largely, has been developed. A size of the mobile terminal may be varied using a deforming property of the flexible display. When twisting or excessive deformation occurs in the mobile terminal having such a variable structure, a defect may occur in the mobile terminal. Thus, a change of the structure of the mobile terminal should be performed stably.

In addition, in order to show an intended content or screen to the user, the mobile terminal needs to orient the content or screen on the display of such changing shape. Furthermore, the mobile terminal may need to further adjust the oriented content in consideration of an extension direction and the orientation.

SUMMARY

One purpose of the present disclosure is to provide a mobile terminal that may prevent distortion of a frame through a sensor that detects degrees of extension and contraction of a flexible display unit, and may accurately adjust a size of a video output on the display unit.

One aspect of the present disclosure proposes a mobile terminal including a first frame, a second frame movable in a first direction or in a second direction opposite to the first direction with respect to the first frame, a slide rail extending in the first direction on the first frame, a slidably-moving portion coupled to the second frame and moving along the slide rail, a sensing terminal located on the slide rail, a sensing resistor connected to the sensing terminal, an input resistor positioned between a power supply unit and the sensing resistor, a detecting unit for measuring a voltage between the sensing resistor and the input resistor, a ground terminal located on the slidably-moving portion and facing the sensing terminal, and a controller that calculates a position of the second frame based on the voltage detected by the detecting unit when the ground terminal is in contact with the sensing terminal.

In one implementation, the slidably-moving portion may include a groove recessed in a face facing the slide rail, and the ground terminal may be located above the groove and in contact with the slide rail.

In one implementation, the ground terminal may include a conductive gasket made of an elastic material.

In one implementation, the mobile terminal may further include a flexible substrate having the sensing resistor and the input resistor formed thereon, and the sensing terminal may be mounted on the flexible substrate to be connected with the sensing resistor.

In one implementation, the sensing terminal may include a pogo pin having elasticity.

In one implementation, a plurality of sensing terminals may be arranged in the first direction, and a plurality of sensing resistors respectively connected to the plurality of sensing terminals may have different resistance values.

Another aspect of the present disclosure proposes a mobile terminal including a first frame, a second frame movable in a first direction or in a second direction opposite to the first direction with respect to the first frame, a flexible display unit including a fixed portion coupled to the first frame and a variable portion extending in the first direction and bent in a direction of a rear face of the second frame, a slide rail extending in the first direction on the second frame, a sensing terminal located on the slide rail, a sensing resistor connected to the sensing terminal, an input resistor positioned between a power supply unit and the sensing resistor, a detecting unit for measuring a voltage between the sensing resistor and the input resistor, a ground terminal coupled to a rear face of the flexible display unit and facing the sensing resistor, and a controller that calculates a position of the second frame based on the voltage detected by the detecting unit when the ground terminal is in contact with the sensing terminal.

In one implementation, the flexible display unit may include a display panel for outputting a video and a back plate for supporting a rear face of the display panel and containing a metal material, and the ground terminal may be connected to the back plate.

In one implementation, the mobile terminal may further include a third frame coupled to an end of the variable portion and moving in the first direction along the slide rail on a rear face of the second frame, and the ground terminal may be located on the second frame.

In one implementation, the sensing terminal may be located on a side face of the slide rail, and the ground terminal may extend vertically from the flexible display unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 3 shows perspective views respectively illustrating a first state and a second state viewed from one side of a mobile terminal according to one embodiment;

FIG. 4 shows rear face views respectively illustrating a first state and a second state of a mobile terminal according to one embodiment;

FIG. 9 is a view for describing an operating principle of a sensing unit;

FIG. 11 illustrates another embodiment of a sensing unit of a mobile terminal.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

The terminology used in the present disclosure is used only to describe specific embodiments, not intended to limit the present disclosure. A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
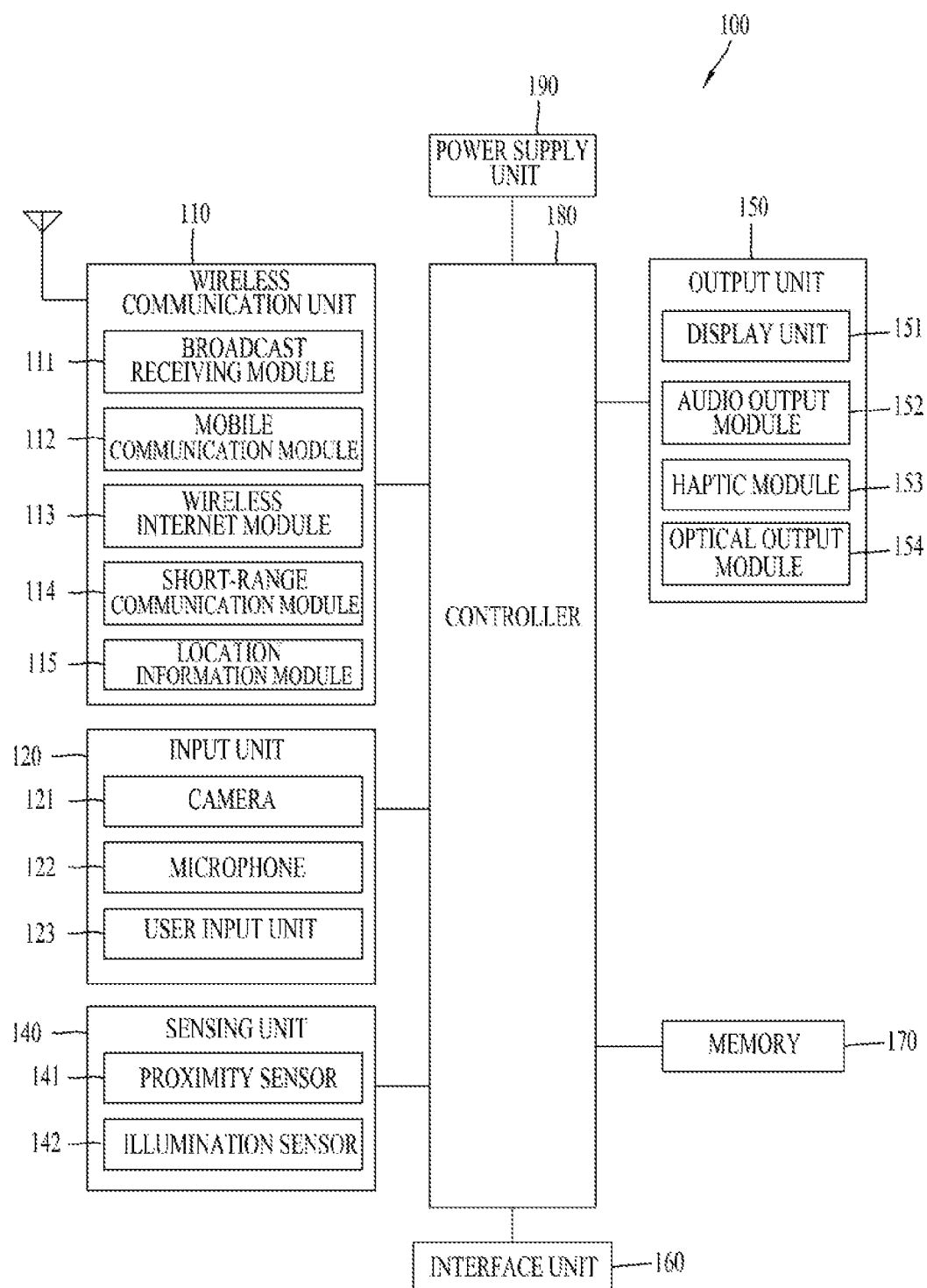
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
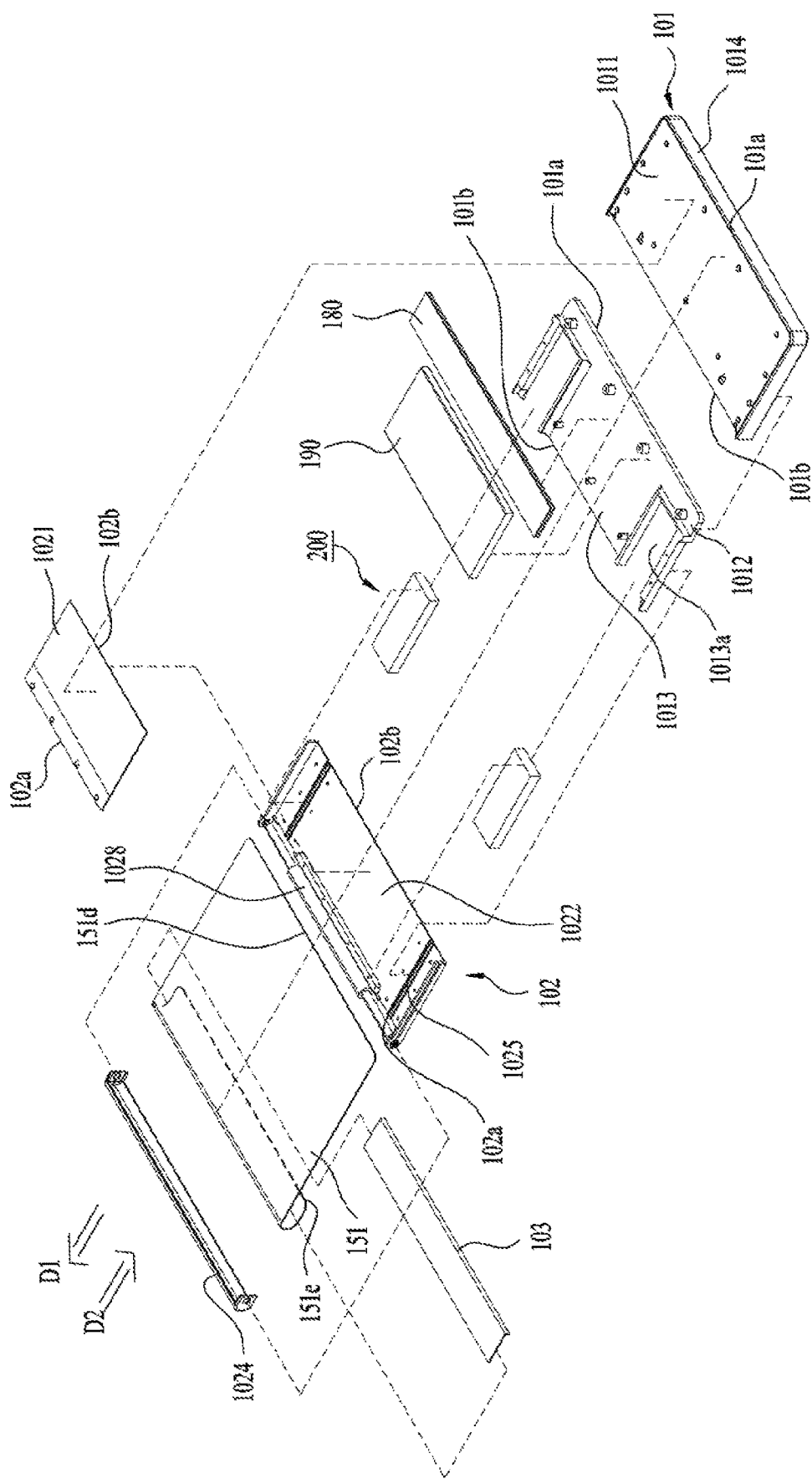
FIG. 2 is an expanded perspective view of a mobile terminal according to one embodiment.
Figure 5:
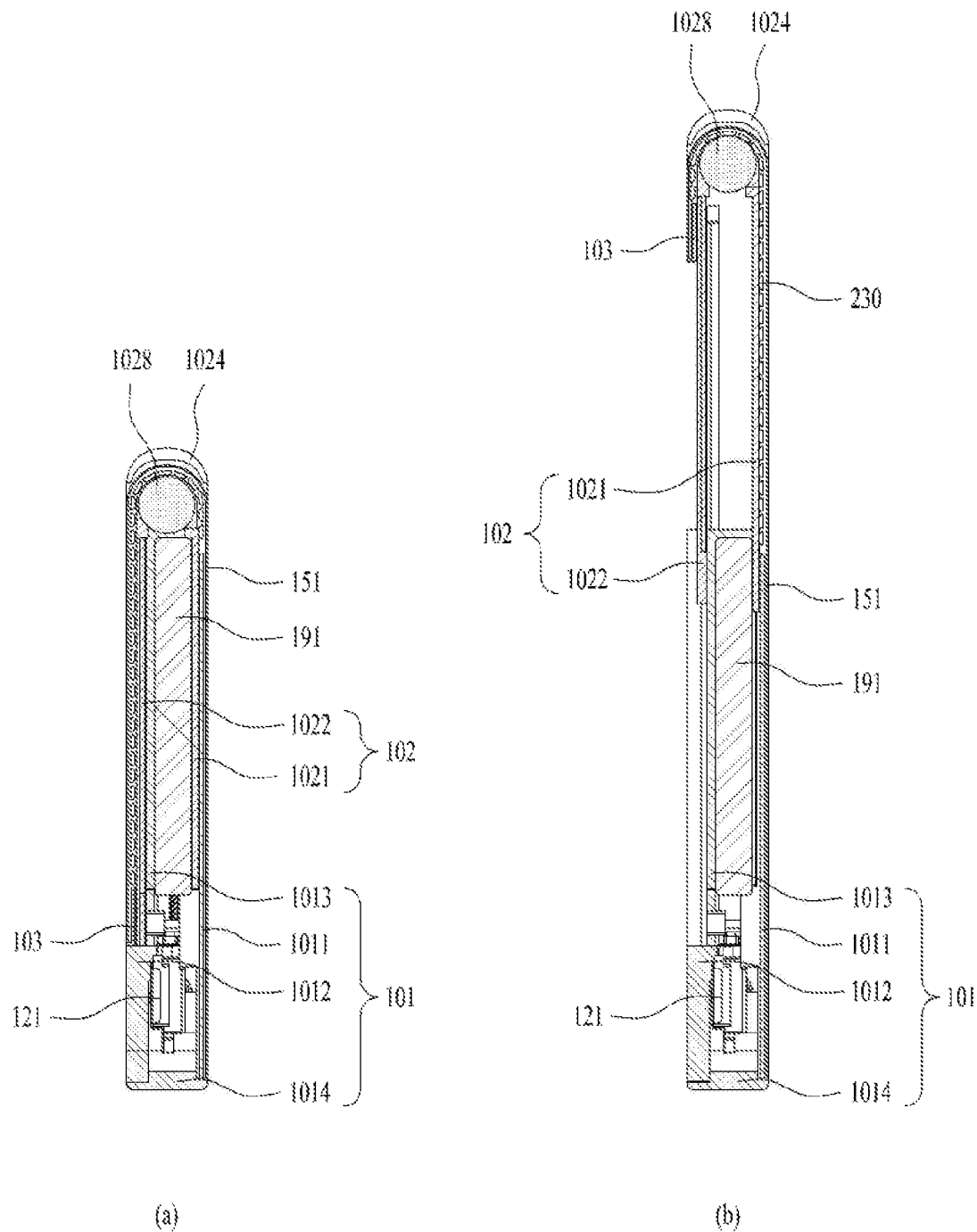
FIG. 5 shows cross-sectional views respectively taken along a line A-A and a line B-B of FIG. 3.

FIG. 2 is an expanded perspective view of a mobile terminal according to one embodiment. Further, FIG. 3 shows perspective views respectively illustrating a first state and a second state viewed from one side of a mobile terminal according to one embodiment. Further, FIG. 4 shows rear face views respectively illustrating a first state and a second state of a mobile terminal according to one embodiment. Further, FIG. 5 shows cross-sectional views respectively taken along a line A-A and a line B-B of FIG. 3. In these drawings, FIGS. 3(a), 4(a), and 5(a) show a first state of the mobile terminal, and FIGS. 3(b), 4(b), and 5(b) show a second state of the mobile terminal.

As shown, a mobile terminal 100 in a first state is contracted, and has a smaller size than the mobile terminal 100 in a second state. In addition, a size of a display unit 151 located disposed on a front face of the mobile terminal 100 also becomes smaller than that of the display unit 151 in the second state. The mobile terminal 100 of the first state is expanded in a first direction D1 to be in the second state. In the second state, the size of the mobile terminal 100 and a size of a front face of the display unit 151 are larger than those in the first state. In a following description, a direction in which the mobile terminal 100 and the display 151 thereof are extended or enlarged is referred to as a first direction D1, a direction in which the mobile terminal 100 and the display 151 thereof are contracted or retracted, or reduce to be converted into the first state from the second state is referred to as a second direction D2, and a direction perpendicular to the first and second directions D1 and D2 is referred to as a third direction.

The mobile terminal 100 of the present disclosure may be converted from the first state in which the display unit 151 is positioned on the front face of a bar-shaped mobile terminal as shown in FIG. 3(a) into the second state as shown in FIG. 3(b) by enlarging a screen thereof. In the second state, an area of the front face of the display unit 151 is enlarged, and an area of a rear face of the display unit 151 is reduced as shown in FIG. 4(b). That is, the display unit 151 positioned on a rear face of the mobile terminal 151 in the first state moves to the front face of the mobile terminal 100 in the second state.

As such, the display unit may use a flexible display unit 151 that may be bent such that the position of the display unit may be varied. The flexible display is a lightweight, unbreakable, and durable display that is built on a thin and flexible substrate that may be bent, crooked, folded, twisted, or rolled while retaining properties of a conventional flat panel display.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display region of the flexible display unit 151 becomes flat. In a state in which the flexible display unit 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color.

The flexible display unit 151 may be in a curved state (e.g., a vertically or horizontally curved state) rather than a flat state in the basic state. In this case, when the external force is applied to the flexible display unit 151, the flexible display unit 151 may be deformed into the flat state (or a less curved state) or more curved state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to third frames 101 to 103 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may be various information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200 to be described later.

The flexible display unit 151 of the present disclosure is bent 180 degrees while being rolled on one of both sides of the mobile terminal 100. Thus, a portion of the display unit 151 is disposed on the front face of the mobile terminal 100 based on such side, and the other portion thereof is disposed on the rear face of the mobile terminal 100. A portion of the display unit 151 located on the front face of the mobile terminal 100 may be fixed to the front face so as not to move. Further, the other portion thereof located on the rear face of the mobile terminal 100 may be movable to the rear face.

In addition, the display unit 151 may be rolled on or released from the side. Accordingly, the portion disposed on the rear face of the mobile terminal 100 moves, so that the size of the portion disposed on the front face of the mobile terminal 100 may be adjusted. Since the area of the flexible display unit 151 is determined and the flexible display unit 151 is formed of one continuous body, an area of the portion on the rear face decreases as an area of the portion on the front face increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

With reference to FIGS. 2 to 5, a detailed configuration of the mobile terminal 100 of the present disclosure will be described in detail below. A following description will be achieved basically with reference to FIG. 2 illustrating an overall configuration. FIGS. 3 to 5 are referred to explain detailed features of corresponding components in the first and second states of the mobile terminal 100.

The mobile terminal 100 of the present disclosure includes a main frame in which components are mounted, and the main frame of the present disclosure may vary in size in the first direction as shown in FIG. 2. One or more frames move relative to each other, and sizes thereof may vary in the first direction. Electronic components are mounted in the main frame, and the flexible display unit 151 is located out of the main frame.

Since the mobile terminal 100 of the present disclosure includes the flexible display unit, the flexible display unit 151 may be combined in a form surrounding a front face and a rear face of the main frame. The main frame may include first to third frames 101 to 103. The main frame may include the first frame 101, the second frame 102 moving in the first direction with respect to the first frame 101, and the third frame 103 moving in the first direction with respect to the second frame 102. The first frame 101 and the second frame 102 include front portions, a rear portions, and side portions, respectively, and are coupled to each other. Thus, the mobile terminal 100 may have a hexahedral outer shape by such coupled first and second frames 101 and 102. In consideration of an illustrated configuration of the first to third frames 101 to 103, movements of the second and third frames 102 and 103 may be a slide movement.

First, the first frame 101 corresponds to a main body of the mobile terminal 100, and may have a space therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and a first rear portion 1012 and a second rear portion 1013 disposed at a rear portion of the mobile terminal.

Such first front portion 1011, first rear portion 1012, and second rear portion 1013 may be respectively formed of plate-shaped members that are generally flat. The first rear portion 1012 and the second rear portion 1013 may be respectively formed of separate members coupled to each other or may be formed of one member as shown. The first front portion 1011 and the first rear portion/second rear portion 1012 and 1013 may be spaced apart from each other at a predetermined spacing to define a predetermined space therebetween, and may be connected to each other by a side portion 1014. The controller 180 and the power supply unit 190 may be accommodated as components of the mobile terminal 100 in the space in the first frame 101. For example, the controller 180 may be a circuit board including a processor and an electronic circuit for controlling the operation of the mobile terminal, and the power supply unit 190 may be a battery and related components. In addition, the second frame 102 and the driving unit 200 to described later may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. When the flexible display unit 151 may be damaged when being bent. Thus, the flexible display unit 151 may be formed to be bent with a predetermined curvature.

The display unit 151 may be divided into a fixed portion and a variable portion. The fixed portion means a portion fixed to the frame. Because of being fixed to the frame, the fixed portion maintains a constant shape without changing a bending degree. On the other hand, the variable portion means a portion in which a bending angle or a position of the bent portion changes. The variable portion in which the position or bending angle of the bent portion changes requires a structure for supporting a rear face of the variable portion in response to the change.

A first region of the display unit 151 may be coupled to the first front portion 1011 corresponding to the front face of the mobile terminal 100.

In one example, as shown in FIG. 4, various physical input units 120 for manipulation of the mobile terminal 100 and sensing units 140 may be located on the first rear portion 1012, and the display unit 151 may be disposed only on the second rear portion 1013. Since the first rear portion 1012 does not overlap the flexible display unit 151 regardless of the state of the mobile terminal, and is always exposed to the outside, the input unit 120 such as various buttons, switches, the camera 121, and a flash, and the sensing unit 140 such as a proximity sensor 141 may be arranged on the first rear portion 1012. In a conventional bar-shaped terminal, a display unit is provided only on a front face of the terminal. Therefore, a main camera is placed on a rear face of the terminal in order for the user to capture an object at an opposite side while looking through the display unit. On the other hand, an additional auxiliary camera is required to be disposed on the front face of the terminal in order for the user to capture himself or herself while viewing himself or herself through the display unit.

However, the display unit 151 is positioned at both the front face and the rear face of the mobile terminal 100 of the present disclosure. Therefore, when the user captures himself or herself, a display unit on the same face as the camera 121, that is, the portion of the display 151 on the rear face of the mobile terminal 100 in the drawing may be used. Further, when the user captures the object on the opposite side of the user, a display unit on the opposite face of the camera 121, that is, the portion of the display unit 151 on the front face of the mobile terminal 100 in the drawing may be used. For this reason, the mobile terminal 100 may capture the object on the opposite side of the user and capture the user using the single camera 121. The camera may include a plurality of cameras having different angles of view, such as wide angle, super wide angle, and telephotographic cameras. In addition to the camera, a proximity sensor sound output unit may be positioned on the first rear portion 1012, and an antenna 116 may be installed on the first rear portion 1012.

The side portion 1014 may extend along edges of the first front portion 1011 and the first rear portion/second rear portion 1012 and 1013 to surround the first frame 101, and may form the outer shape of the mobile terminal 100. However, as mentioned above, since the second frame 102 is accommodated in the first frame 101 and is movably coupled thereto, in order to allow the movement of the second frame 102 relative to the first frame 101, a portion of the first frame 101 needs to be opened. As shown in FIG. 2, as an example, the second frame 102 is movably coupled to one of both side portions of the first frame 101, so that the side portion 1014 may not be formed on the same side portion, and thus, the portion of the first frame 101 may be opened. Accordingly, the first frame 101 may include a substantially closed first side portion 101*a* and a second side portion 101*b*, which is disposed to be opposite to the first side portion 101*a* and is opened. The side portion 1014 is exposed to the outside of the mobile terminal 100, so that an interface unit 160 for connecting a supply port or an ear jack, the user input unit 120 such as a volume button, or the like may be disposed on the side portion 1014. When containing a metal material, the side portion 1014 may serve as an antenna.

The second rear portion 1013 of the first frame 101 may be covered by the display unit, but may be disposed on the front face of the display unit using a transparent material.

The second frame 102 may include a second front portion 1021 disposed at the front portion of the mobile terminal 100 and a third rear portion 1022 disposed at the rear portion of the mobile terminal 100. Like the first front portion 1011 and the first rear portion 1012 of the first frame 101, the second front portion 1021 and the third rear portion 1023 may be formed of plate-shaped members that are generally flat. In addition, the second frame 102 also accommodates various components, and must not interfere with the components accommodated in the first frame 101 during the movement. Accordingly, the second front portion 1021 and the third rear portion 1022 may be coupled to each other in a state of being spaced apart from each other to define a predetermined space therebetween, and may have shapes that do not interfere with the components in the first frame 101.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 1028 rotatably disposed therein. The roller 1028 may be disposed at any position inside the second frame 102. However, the display unit 151 should be spread flat on the front face and the rear face of the mobile terminal 100 to provide a good quality screen to the user. Further, for such spread, a proper tension must be provided on the display unit 151. In order to provide the proper tension, the roller 1028 may be disposed at a first directional end of the second frame 102. The roller 1028 may extend in the third direction, and may be rotatably coupled to the second frame 102.

The display unit 151 may be rolled around the roller 1028 while being gently bent with a predetermined curvature. The flexible display unit 151 may include a first face on which a video is output and exposed to the outside and an inner face facing the frame at the opposite side. The roller 1028 may be installed to rotate freely in the second frame 102 while being in contact with the inner face of the display unit 151. Accordingly, the roller 1028 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (i.e., the first direction D1 or the second direction D2) relative to the second frame 102. The roller 1028 may guide such movement while rotating.

In addition, the roller 1028 is disposed on a first side portion 102*a* of the second frame 102, and the first side portion 102*a* actually corresponds to an outermost side portion of the mobile terminal 100. When the first side portion 102*a* of the second frame 102 is exposed, the display unit 151 rolled on the roller 1028 may be damaged. Accordingly, the second frame 102 may include a side frame 1024 disposed on the first side portion 102*a*.

The side frame 1024 extends in the longitudinal direction of the second frame 102 to cover the first side portion 102*a*, thereby protecting the roller 1028 and the display unit 151 rolled thereon. That is, the side frame 1024 covers the side face of the display unit 151, and the side face thereof is located in the third region. The first to third regions are at specified positions on the flexible display unit and do not change in size or position, but the sizes of the front face and the rear face, and the position of the side face are determined based on the state of the main frame. The first region and the second region correspond to the fixed portion described above, and the third region corresponds to the variable portion described above.

The third region may vary in position depending on the state of the mobile terminal. Because the side face is rolled by the roller, the side face is bent with the predetermined curvature, and an inner face of the side frame may include a curved face corresponding to the curvature of the side face.

Because of the side frame 1024, the second frame 102 may have the substantially closed first side portion 102*a*, and the side frame 1024 may substantially form the outer shape of the mobile terminal 100 together with the side face 1014 of the first frame 101. In addition, the second frame 102 may include a second side portion 102*b* that is disposed opposite the first side portion 102*a* to minimize interference with the components within the first frame 101 during the movement, and is opened.

Such a second frame 102 is movably coupled to the first frame 101, and thus may slide in the predetermined first or second direction D1 or D2 relative to the first frame 101. More specifically, the second frame 102 may be movably coupled to the first frame 101 through the side portion of the first frame 101, more precisely, through the opened second side portion 101*b*, as shown. More specifically, the second side portion 102*b* of the second frame is disposed relatively adjacent to the first side portion 101*a* of the first frame 101 which is closed. Accordingly, the first side portion 102*a* of the second frame may be disposed to be opposite to the first side portion 101*a*. Accordingly, the second side portion 102*b* is inserted into the first frame 101 through the side portion of the first frame, that is, the second side portion 101*b* thereof. The first side portion 102*a* is not inserted into the first frame 101 but is always located outside the first frame 101, thereby forming the outer shape of the mobile terminal 100 as described above. However, when necessary, such first side portion 102*b* of the second frame 102 may also be inserted into the first frame 101.

Because of such positional relationship, the second frame 102 may extend from or contract to the first frame 101 in a direction perpendicular to the longitudinal direction of the mobile terminal 100 or the first frame 101. That is, the first and second directions D1 and D2 may basically be directions perpendicular to the longitudinal direction of the mobile terminal 100 or the first frame 101. Further, the first and second directions D1 and D2 may also be described as the lateral direction or the horizontal direction of the mobile terminal 100 or the first frame 101. In addition, during the movement in the first direction D1, the second frame 102 extends from the first frame 101. Accordingly, the first direction D1 may be a direction in which the second frame 102 moves away from the first frame 101, that is, moves outwardly of the mobile terminal 100 or the first frame 101. On the other hand, during the movement in the second direction D2, the second frame 102 contracts to the first frame 101. Thus, the second direction D2 is a direction opposite to the first direction D1, so that the second direction D2 may be a direction in which the second frame 102 moves to become closer to the first frame 101, that is, moves inwardly of the mobile terminal 100 or the first frame 101. When being moved in the first direction D1, such second frame 102 extends and applies a force to the portion of the display unit 151 disposed on the rear face of the mobile terminal 100, so that the portion of the display unit 151 may be disposed on the front face of the mobile terminal 100, and a region for such additional arrangement may be defined. Thus, the second frame 102 may convert the mobile terminal 100 into the second state with the display unit 151 with the relatively extended front face by moving in the first direction D1. On the other hand, when being moved in the second direction D2, the second frame 102 contracts into an original state thereof, and applies a force to the portion of the display unit 151 disposed on the front face of the mobile terminal 100 to return to the rear face of the mobile terminal 100 again. Thus, the second frame 102 may convert the mobile terminal 100 into the first state with the display unit 151 with the relatively contracted front face by moving in the second direction D2. Accordingly, the second frame 102 selectively exposes the display unit 151 to the front face of the mobile terminal 100 depending on the moving direction (i.e., the first or second direction D1 and D2). Accordingly, the mobile terminal 100 may be converted into the first or second state defined above.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, as shown in FIG. 5. That is, a front face of the second front portion 1021 may face the rear face of the first front portion 1011. In addition, the rear face of the first front portion 1011 may be in contact with the front face of the second front portion 1021 to stably support the movement of the second frame 102.

The third rear portion 1022 of the second frame 102 may be disposed below the second rear portion 1013 of the first frame 101. That is, the front face of the third rear portion 1022 may face the rear face of the second rear portion 1013. In addition, the rear face of the second rear portion 1013 may be in contact with the front face of the third rear portion 1022 to stably support the movement of the second frame 102. Because of such arrangement, the third rear portion 1022 may be exposed to the outside of the first frame, more precisely, of the second rear portion 1013, and may be coupled to the display unit 151.

Alternatively, when the second rear portion 1013 is made of a transparent material, the second rear portion 1013 may form an outer shape of the rear face of the mobile terminal. The second rear portion 1013 may be positioned rearward of the third rear portion 1022 of the second frame, and the flexible display unit may be disposed between the second rear portion 1013 and the third rear portion 1022 in the first state.

When the second rear portion 1013 is made of a material such as a transparent glass to form the outer shape of the rear face of the mobile terminal, the first rear portion 1012 may be implemented using the same member as the second rear portion 1013. That is, the camera 121, the flash or the sensing unit 140, and the like may be arranged by partially coating the plate-shaped member of the transparent glass material to not allow the internal components to be visible and by not coating only a required portion.

In addition, the second frame 102 may expand and contract the size of the mobile terminal 100 itself, particularly the front face of the mobile terminal 100 by the expansion and the contraction in the first and second directions D1 and D2. Thus, the display unit 151 must move by such extended or reduced front face size to obtain the intended first and second states. However, when being fixed to the second frame 102, the display unit 151 may not be moved smoothly to be adapted for the front face of the mobile terminal 100 that is expanded or contracted. For this reason, the display unit 151 may be movably coupled to the second frame 102. More specifically, the display unit 151 may include a first side edge (or side end) 151d disposed on the front face of the mobile terminal 100 and a second side edge 151e opposite to the first side edge 151d and disposed on the rear face of the mobile terminal 100. The first side edge 151 may be disposed on the front face of the first frame 101, that is, the front face of the first front portion 1011 thereof, and may be disposed adjacent to the side portion of the mobile terminal 100, that is, the first side portion 101a of the first frame. On the other hand, since the second side edge 151e is adjacent to the rear face of the mobile terminal 100 and the third rear portion 1022 of the second frame 102, the second side edge 151e may is be coupled the third rear portion 1022 of the second frame 102 to be movable in the first and second directions D1 and D2. In addition, since the display unit 151 is not structurally strong, a third frame 103 may be coupled to the second side edge 151e. The third frame 103 may be formed of a plate-shaped member extending in the longitudinal direction of the mobile terminal 100. Accordingly, the third frame 103 may be coupled to the second frame, that is, the third rear portion 1022 thereof to be movable in the first and second directions D1 and D2 instead of the second side edge 151e. In addition, the second frame 102 may include a slot 1025 extending in the lateral direction of the mobile terminal 100 or the second frame 102, that is, the direction perpendicular to the longitudinal direction thereof. Further, the third frame 103 may be stably moved while being guided by the slot 1025. The third frame 103 may include, for example, a projection inserted into the slot 1025 for the movement along the slot 1025.

Referring to FIGS. 3 to 5, in connection with such configuration of the first to third frames 101, 102, and 103, the display unit 151 may include a first region 1511 extending from one side thereof, that is, the first side edge 151d toward the second side edge 151e by a predetermined length, and a second region 1512 disposed opposite the first region 1511, and extending from the second side edge 151e toward the first side edge 151d by a predetermined length. In addition, the display unit 151 may include a third region 1513 disposed between the first and second regions 1511 and 1512. Such first to third regions 1511, 1512, and 1513 may be connected to each other, and may form a continuous body of the display unit 151. In addition, as described above, for the movement of the third region 1513 toward the front face or the rear face of the mobile terminal 100 depending on the moving direction of the second frame 102, the first region 1511 may be fixed so as not to move to the front face of the mobile terminal 100, and the second region 1512 may be provided to be movable on the rear face of the mobile terminal. Such configuration of the display unit 151 will be described in more detail below.

The first region 1511 may be disposed on the front face of the mobile terminal 100, more specifically, the first frame 101, that is, on the front face of the first front portion 1011. The first region 1511 is fixed to the first frame 101, that is, the front face of the first front portion 1011 so as not to be moved during the movement of the second frame 102, and thus, the first region 1511 may always be exposed to the front face of the mobile terminal 100. The third region 1513 may be adjacent to the first region 1511, and may extend into the second frame 102 and rolled on the roller 1028. The third region 1513 may consecutively extend out of the second frame 102 again and partially cover the second frame 102, that is, the rear face of the third rear portion 1022. Further, the second frame 102, that is, the third rear portion 1022, is adjacent to the first frame 101, that is, the second rear portion 1013 and together forms the rear case of the mobile terminal 100, so that it may be described that the third region 1513 is also disposed on the rear face of the first frame 101.

The second region 1512 may be adjacent to the third region 1513 and may be disposed on the rear face of the mobile terminal 100, more specifically, on the second frame, that is, the rear face of the third rear portion 1022 thereof. The second region 1512 may be coupled to the third frame 103 without being directly coupled to the second frame 102. As shown in FIG. 4(b), the slot 1025 extending in the lateral direction (i.e., the direction perpendicular to the longitudinal direction of the mobile terminal 100) to the second frame 102, that is, to the third rear portion 1022 is defined. Further, the third frame 103 may move along the slot 1025. In FIG. 4(b), it is shown that the slot 1025 is defined in the rear face of the second frame 102, but may be defined in the side face of the second frame 102. Although the second region 1512 may move in the first or second direction D1 or D2 with respect to the second frame 102 together with the third frame 103, the movement of the second region 1512 may be restricted within the rear face of the mobile terminal 100 by the slot 1025. That is, the second region 1512 does not move out of the second frame 102 even when the second frame 102 is extended or contracted, and may move along the slot 1025 within the second frame 102 by the extended or contracted distance of the second frame 102. Accordingly, the second region 1512 may always be exposed to the rear face of the mobile terminal 100.

As a result, the first region 1511 may be disposed on the front face of the mobile terminal 100 and may be always exposed to the front face regardless of the movement of the second frame 102, and the second region 1512 may be disposed on the rear face of the mobile terminal 100 and may be always exposed to the rear face regardless of the movement of the second frame 102. In addition, the third region 1513 may be disposed between the first and second regions 1511 and 1512, and may be selectively placed on the front face or the rear face of the mobile terminal 100 depending on the moving directions D1 and D2 of the second frame 102.

Because of such selective placement of the third region 1513, as shown in FIG. 4(b), the second rear portion 1013 of the first frame 101 is covered by the second and third regions 1512 and 1513 and the third rear portion 1022 of the display unit 151 in the first state, but the third region 1513 moves to the front face of the mobile terminal 100 in the second state, and the third rear portion 1022 also moves in the first direction D1, so that the mobile terminal 100 may be exposed to the outside. In addition, the second front portion 1021 of the second frame 102 is disposed below the first front portion 1011 of the first frame 101 in the first state, but is moved out of the first frame 101 and supports the third region 1513 of the display unit 151 disposed on the front face of the mobile terminal 100 in the second state.

Since the first and second regions 1511 and 1512 are always respectively arranged on the front face and the rear face of the mobile terminal 100, curvatures of the first region 1511 and the second region 1512 do not change, and the first region 1511 and the second region 1512 may be maintained in a flat basic state. However, the third region 1513 may be rolled on the roller 1028 and bent in the second frame 102. When converting from the first state to the second state, the third region 1513 may extend from the second frame 102 to the front face of the mobile terminal 100 while being rolled on the roller 1028 in one direction. On the other hand, when converting from the second state to the first state, the third region 1513 may be retracted from the front face of the mobile terminal 100 to the second frame 102 while being rolled on the roller 1028 in the opposite direction, and at the same time, may return to the rear face of the mobile terminal 100 from the second frame 102. A specific location of the foldable mobile terminal in a form of being spread like a book is easily damaged because only the specific location is folded repeatedly. On the other hand, the deformed portion of the flexible display unit 151, that is, a portion rolled on the roller 1028, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

As shown in FIGS. 3A, 4A, and 5A, the second frame 102 is fully retracted into the first frame 102 in the first state. Therefore, only the first region 1511 of the display unit 151 fixed to the front face of the first frame 101 may be exposed to the front face of the mobile terminal 100. Such first region 1511 may be fixed and supported to the first frame 101, that is, the first front portion 1011 thereof. In addition, a major portion of the third region 1513 may be disposed on the rear face of the mobile terminal 100 together with the second region 1512, and the third region 1513 may be disposed in the second frame 102 while being partially rolled on the roller 1028. The third region 1513 of the rear face of the mobile terminal 100 may be supported by the second frame, that is, the third rear portion 1022 thereof. The second region 1512 may be fixed by the third frame 103 disposed on the second frame (i.e., the third rear portion 1022) and may be movably coupled to the second frame 1012.

In such first state, when the second frame 102 moves in the first direction D1, the mobile terminal 100 may be converted into the second state. As shown in FIGS. 3B, 4B, and 5B, the second frame 102 may extend from the first frame 101 by the movement in the first direction D1, and may increase the overall size of the mobile terminal 100, in particular, the front face thereof. During the movement in the first direction D1, the second frame 102 may apply a force, that is, a tension, to the display unit 151 in the first direction D1. The display unit 151 is fixed to the first frame 101 but is coupled to the second frame 102 so as to be movable using the third frame 103, so that the force applied by the second frame 102 allows the third region 1513 to be rolled out from the roller 1028 of the second frame 102 to the front face of the mobile terminal 100. That is, the third region 1513 may be withdrawn (or pulled out) from the second frame 102 or extend to (or move out of) the second frame 102. At the same time, the third region 1513, particularly, the portion located on the rear face of the third region 1513 may be rolled into the roller 1028 of the second frame 102 from the rear face, or may be inserted (or pushed in), retracted, or moved into the second frame 102. Not an entirety of the third region 1513 is withdrawn from the second frame 102 to the front face of the mobile terminal 100, and a portion of the third region 1513 may be disposed in the second frame 102 while still being rolled on the roller 1028. In addition, for the smooth movement of the third region 1513, the second region 1512 may also move in the first direction D1 with respect to the second frame 102 together with the third frame 103. In addition, as described above, the second region 1512 and the third frame 103 may be constrained to the second frame 102 and move in the first direction D1 with respect to the first frame 101 together with the second frame 102. Accordingly, the second region 1512 and the third frame 103 may move in the first direction D1 relative to the first frame 101 as well as the second frame 102, and accordingly, move a distance longer than the moved distance of the second frame 102. Thus, because of such long distance movement in the first direction D1 of the second region 1512, the third region 1513 may be smoothly extended to the front face of the mobile terminal 100. Further, for the movement of the third region 1513, which is proportional to the expansion of the second frame 102, the movement of the second region 1512 and the third frame 103 in the first direction D1 may be performed simultaneously with the movement of such third region 1512 and second frame 102 in the first direction D1 so as to be proportional to the movement of third region 1513 and second frame 102.

When the second frame 102 is fully extended in the first direction D1, the first and third regions 1511 and 1513 may be arranged on the front face of the mobile terminal 100, and only the second region 1512 may be disposed on the rear face of the mobile terminal 100. Such first and third regions 1511 and 1513 may be supported by the first frame (i.e., the first front portion 1011 thereof) and the second frame (i.e., the second front portion 1021 thereof). In addition, the second frame 102, i.e., the third rear portion 1022 thereof exposes the second rear portion 1013 of the first frame while extending in the first direction D1, and supports the moving third region 1513. Therefore, in the second state, the mobile terminal 100 may have the extended front face display unit 151.

On the other hand, when the second frame 102 moves in the second direction D2 in the second state, the mobile terminal 100 may again return into the first state as shown in FIGS. 3A, 4A, and 5A. The second frame 102 may be contracted to the first frame 101 by the movement in the second direction D2, and may reduce the overall size of the mobile terminal 100, particularly the front face thereof. The movement of the display unit 151 during such movement of the second frame 102 may be performed in a reverse order of the movement in the first direction D1 described above. In brief, the third region 1513 may be rolled from the front face of the mobile terminal 100 into the roller 1028 of the second frame 102, or may be inserted, retracted, or moved into the second frame 102. At the same time, the third region 1513 may be rolled, withdrawn, extended, or moved out of the roller 1028 of the second frame 102 to the rear face of the mobile terminal 100. Not the entirety of the third region 1513 may be withdrawn from the second frame 102 to the rear face of the mobile terminal 100, and the portion of the third region 1513 may still be placed in the second frame 102 while still being rolled on the roller 1028. In addition, for such smooth movement of the third region 1513, the second region 1512 may also move in the second direction D2 with respect to the second frame 102 together with the third frame 103. The second region 1512 and the third frame 103 may be constrained to the second frame 102 to move in the second direction D2 with respect to the first frame 101 together with the second frame 102. Accordingly, the second region 1512 and the third frame 103 may move relatively in the second direction D2 with respect to not only the second frame 102 but also the first frame 101. As a result, the second region 1512 and the third frame 103 may move in the second direction D2 a distance larger than the moved distance of the second frame 102. Thus, because of such long distance movement of the second region 1512, the third region 1513 may be smoothly returned to the rear face of the mobile terminal 100. Further, for the movement of the third region 1513 proportional to the contraction of the second frame 102, the movements of the second region 1512 and the third frame 103 in the second direction D2 may be performed simultaneously with the movements of the third region 1512 and the second frame 102 in the second direction D2 to be proportional to the movements of the third region 1513 and the second frame 102. When the second frame 102 is completely contracted in the second direction D2, the mobile terminal 100 may be converted into the first state as described above, and may have the display unit 151 with the front face that is relatively reduced in comparison with the second state in the first state.

The flexible display unit 151 containing the variable portion is applicable not only to the above-described embodiment in which a width in the first direction of the mobile terminal 100 is variable because of the sliding of the second frame 102, but also to a mobile terminal in which an angle between the plurality of frames 101 and 102 may vary.

For example, the flexible display unit may be applied to a mobile terminal including a first frame and a second frame that is hinge coupled to one side of the first frame and an having a variable angle with the first frame. A variable portion of the mobile terminal of such form may mean a position where a bending angle changes when the angle between the first frame and the second frame changes, and may be located between the first frame and the second frame.

One face of the flexible display unit 151 may output the video thereon, and may be exposed to the outside. Because a bent position or a curvature of bending deflection varies in the variable portion, a support frame 230 in which a curvature thereof may vary corresponding thereto is required. The support frame 230 is a flexible member coupled to the other face of the variable portion of the flexible display unit. When the support frame 230 supports the other face of the flexible display unit 151, stable touch input may be possible even in the variable portion, and the variable portion may be prevented from being damaged by the external force.

In addition, as described above, the second front portion 1021 of the second frame is inside the first front portion 1011 of the first frame in the first state, and then moves in the first direction in the second state, so that a gap corresponding to a thickness of the first front portion 1011 occurs between the flexible display unit 151 and the second front portion 1021. Using the support frame 230 having a thickness corresponding to the gap, a problem in which the front portion extended in the second state is spaced apart from the second front portion 1021 may be solved.

When the support frame 230 has sufficient rigidity, the second front portion may be omitted. Hereinafter, the support frame 230 supporting the variable portion of the flexible display unit will be described in detail.

Figure 6:
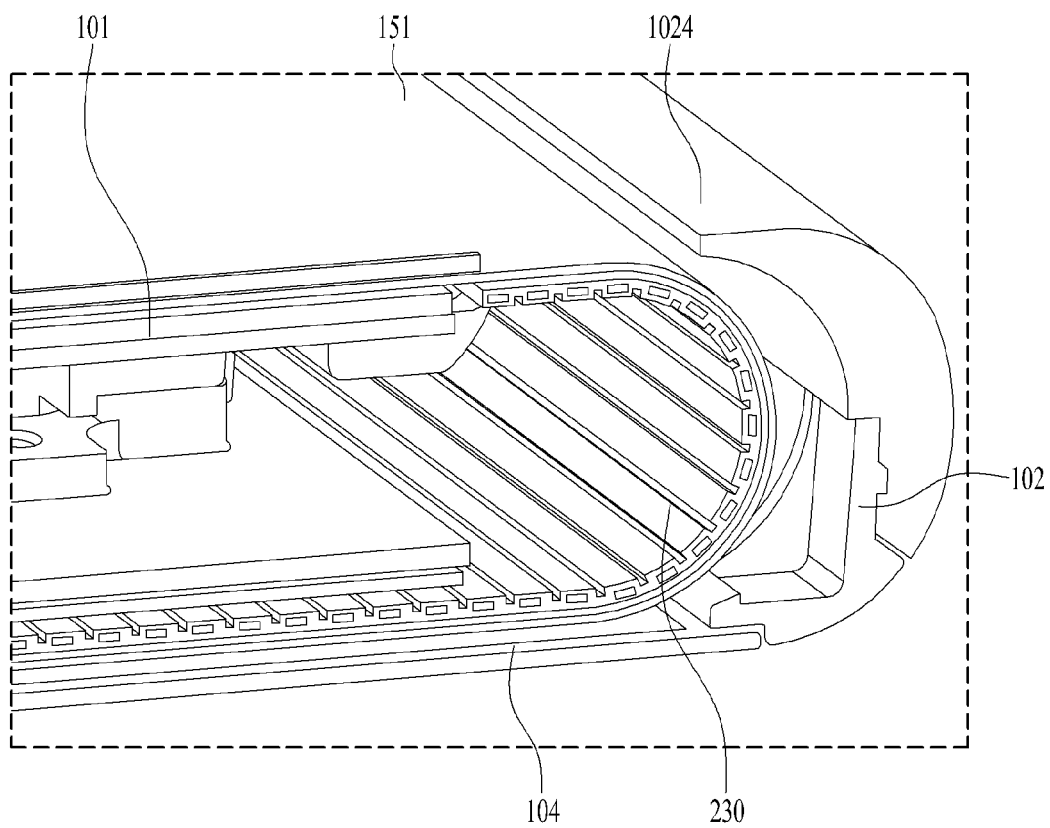
FIG. 6 is a view illustrating a coupling state of a flexible display unit and a support frame of a mobile terminal according to one embodiment.

In a case of the flexible mobile terminal 100, which is the mobile terminal 100 of the type in which the sizes of the frames 101 and 102 are extended and reduced as shown in FIG. 2, the above-described foldable type mobile terminal 100 may be configured such that the flexible display unit 151 is bent with curvature only in a specific direction without bending in all directions. In order to consider the structures of the frames 101 and 102 and to minimize a possibility of damage of the flexible display unit 151, the flexible display unit 151 may be bent only in a specific direction (first direction). The support frame 230 may also be bent only in the first direction, and may have rigidity in the third direction perpendicular to the first direction. FIG. 6 illustrates a coupling state of the flexible display unit 151 and the support frame 230 of the present disclosure. One face of the support frame 230 may be positioned on the other face of the variable portion of the flexible display unit 151, and may vary as the form of the variable portion varies.

The support frame 230 includes a plurality of rigid bars 231 short in the first direction and elongated in the third direction. The rigid bar 231 may use a metal member having rigidity such as SUS or STS. The rigid bar 231 extending in the third direction provides rigidity in the third direction and is short in the first direction, thereby minimizing an effect on the bending deflection in the first direction of the flexible display unit 151. As shown in FIG. 6, the plurality of rigid bars 231 may be arranged side by side in the first direction.

Since it is difficult to couple the plurality of rigid bars 231 to the rear face of the flexible display unit 151 one by one, a flexible portion 232 made of a flexible material may be connected between the plurality of rigid bars 231 in the present disclosure. The flexible portion 232 may contain the flexible material, such as silicon, and arrange the plurality of rigid bars 231 in parallel, and be coupled with the plurality of rigid bars 231 in a double injection molding scheme to form one support frame 230.

Figure 7:
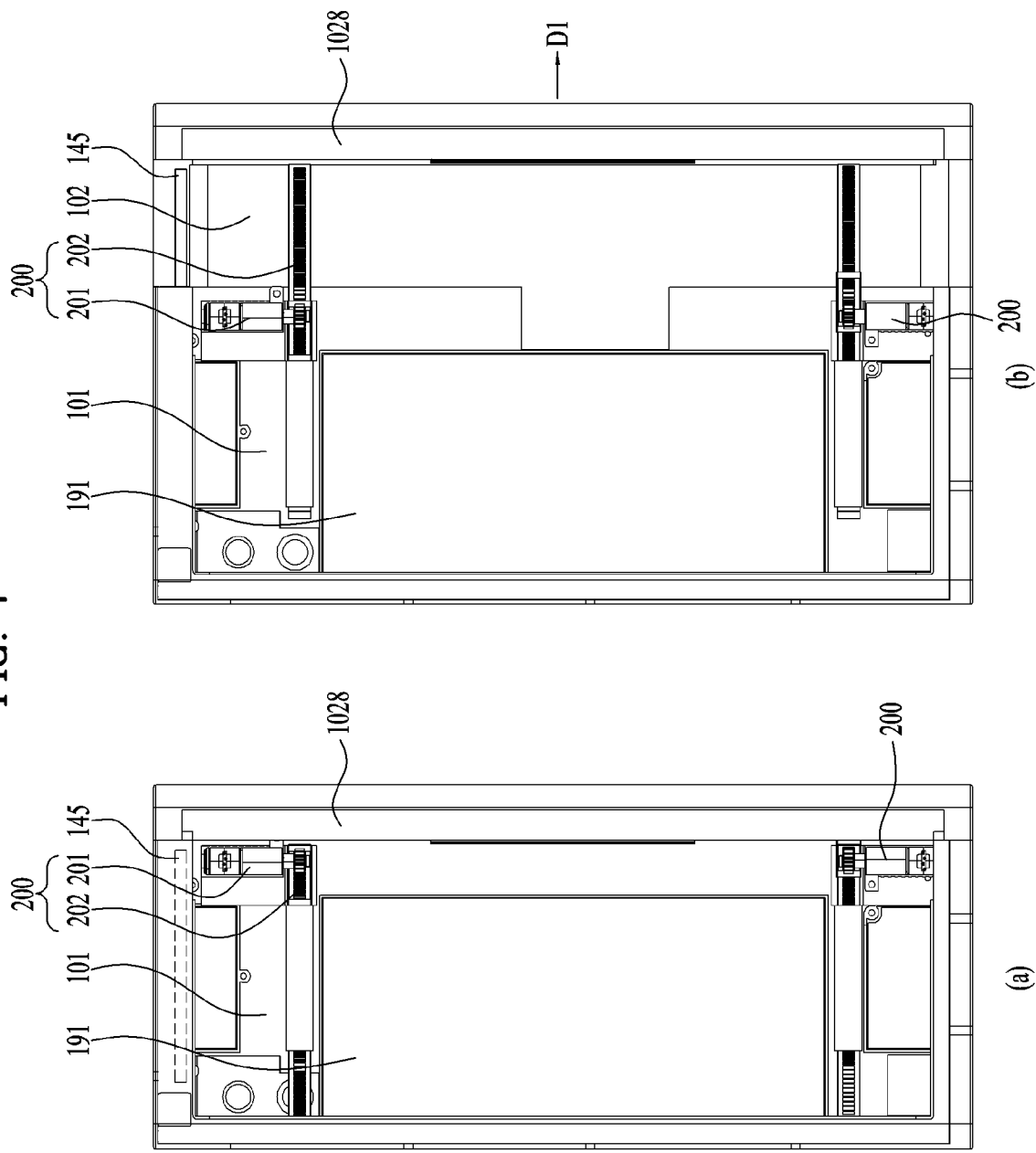
FIG. 7 is a view for describing a position and an operation of a sensing unit of a mobile terminal.

FIG. 7 is a view for describing a position and an operation of the sensing unit 145 of the mobile terminal 100. FIG. 7 is a front view of the mobile terminal 100, which removes the display unit 151 and illustrates the first frame 101 and the second frame 102. FIG. 7(a) shows the first state, and FIG. 7(b) shows the second state. In the conversion from the first state to the second state, an overlapped area of the first frame 101 and the second frame 102 is changed. In the first state, the overlapping area of the first frame 101 and the second frame 102 becomes maximum, and in the second state, the overlapping area of the first frame 101 and the second frame 102 becomes minimum.

The driving unit 200 may include a motor 201 positioned on the first frame 101 and a linear gear 202 that linearly moves in the first direction or the second direction when the motor 201 is driven. The linear gear 202 is coupled to the second frame 102 to change a rotational force of the motor 201 to a linear motion to change the position of the second frame 102.

Figure 8:
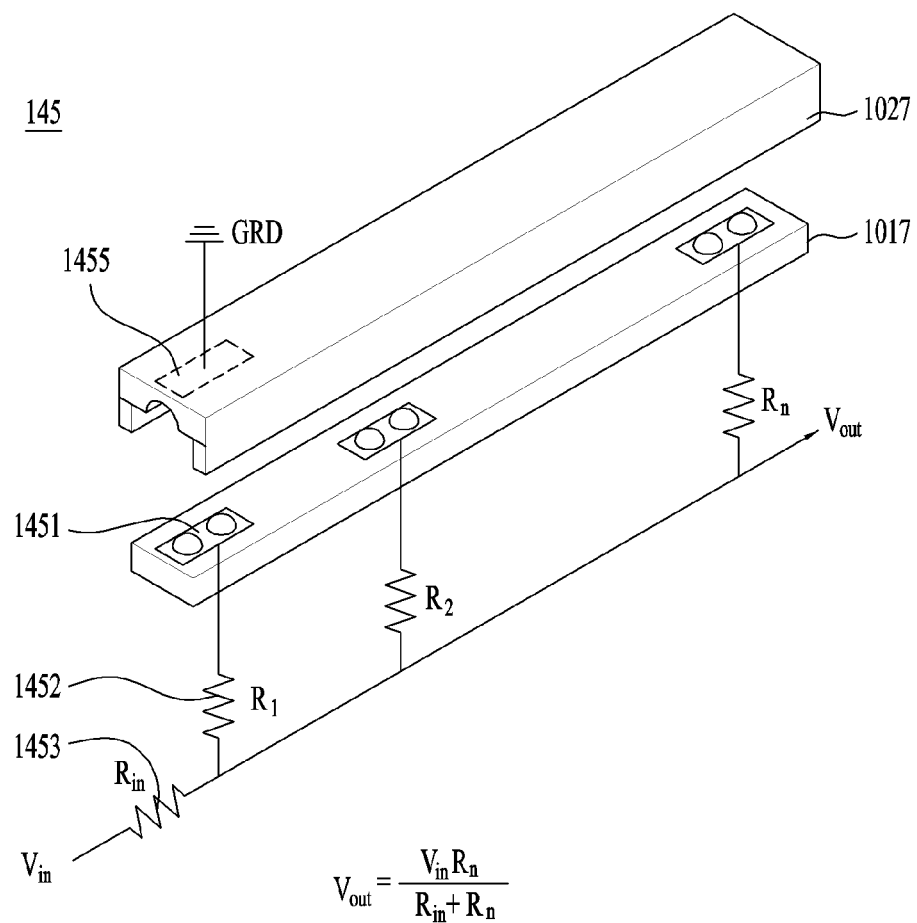
FIG. 8 is a view illustrating an embodiment of a sensing unit of a mobile terminal.

In order to assist the movement of the driving unit 200, a slide rail 1017 formed on the first frame 101 and a slidably-moving portion moving along the slide rail 1017 and fixed to the second frame 102 may be included. The slidably-moving portion may have a rail shape extending in the first direction as shown in FIG. 8. The slidably-moving portion extended in the first direction has a large area engaged with the slide rail 1017, so that the slidably-moving portion may move more stably while reducing a distortion because of the wide engaged area.

An embodiment shown in FIG. 8 has a form in which the slide move portion has a groove defined therein for inserting the slide rail 1017 therein. On the contrary, a form in which a groove extending in the first direction may be defined in the slide rail 1017, and the slidably-moving portion moves along the groove is available.

However, when the second frame 102 reaches the first state and the second state and then does not stop the operation correctly, a load may be applied on the flexible display unit 151 or other components, so that the second frame 102 may be damaged. Further, although the motor 201 operates, the second frame 102 is no longer movable, so that noise may occur. To solve such problem, the controller 180 needs to control the driving unit 200 to stop exactly when the first state or the second state is reached. Further, a sensing unit 145 for detecting the state of the mobile terminal 100 may be further included.

A pair of driving units 200 may be arranged in the third direction (vertical direction in the drawing) as shown in FIG. 7, so that the second frame 102 may move stably. When speeds of the pair of driving units 200 are different, the second frame 102 may be distorted. Thus, the pair of driving units 200 must be synchronized and move at the same speed.

However, when the pair of driving units 200 are different in speed or artificially restrict the movement of the second frame 102, the second frame 102 may be tilted. In this case, the speed of the pair of driving units 200 must be adjusted to correct the tilted position of the second frame 102. As such, in order for the controller 180 to control the driving unit 200 accurately, the sensing unit 145 capable of accurately detecting the position of the second frame 102 is required.

In addition, when the position of the second frame 102 may be accurately detected through the sensing unit 145, the controller 180 may output a video having a size corresponding to an area of the portion of the flexible display unit 151 located on the front face.

In order to detect positions of two members, a magnet and a hall sensor that detects magnetism of the magnet may be used. For example, when a magnet located in the second frame 102 moves to be adjacent to a hall sensor located in the first frame 101, the hall sensor may detect the movement of the second frame 102, and thus, detect the position of the second frame 102. However, since a hall sensor scheme uses a magnetic force, many electronic components in the mobile terminal 100 may be affected, and since magnets are already used in the speaker and the like in the mobile terminal 100, an interference may occur. In addition, an accuracy of the position of the second frame 102 that may be detected by the hall sensor is low.

In order to solve the above problem, the slide rail 1017 and the slidably-moving portion 1027 described above may include resistors and electrodes, and thus may detect a position of the slidably-moving portion on the slide rail 1017 based on the movement of the second frame 102.

FIG. 8 is a diagram illustrating an embodiment of the sensing unit 145 of the mobile terminal 100, and the sensing unit 145 is formed on the slide rail 1017 and the slidably-moving portion 1027. The sensing unit 145 includes a sensing terminal 1451 located on the slide rail 1017. The sensing unit 145 may include a sensing resistor 1452 connected to the sensing terminal 1451, and an input resistor 1453 positioned between the sensing terminal 1451 and a power supply unit. The sensing unit 145 may include a ground terminal 1455, which may be in contact with the sensing terminal 1451, on a face of the slidably-moving portion 1027 facing the slide rail 1017. The ground terminal 1455 is a grounded electrode. When the sensing terminal 1451 and the ground terminal 1455 are in contact with each other, a circuit connected to the sensing terminal 1451 is grounded. Further, when power is applied from the power supply unit, current flows to the input resistor 1453, the sensing resistor 1452, the sensing terminal 1451, and the ground terminal 1455.

When measuring a voltage (Vout) between the input resistor 1453 and the sensing resistor 1452, the detecting unit may calculate a resistance value of the sensing resistor 1452 through a formula shown in FIG. 8 using values of an input voltage Vin and a resistance of the input resistor 1453.

As illustrated in FIG. 8, a plurality of sensing terminals 1451 may be provided along the slide rail 1017, and in this case, the sensing resistors 1452 of the respective sensing terminals 1451 may be different. FIG. 9 is a view for describing the operating principle of the sensing unit 145. As shown in FIG. 9, depending on the position of the slidably-moving portion 1027 on the slide rail 1017, a sensing terminal 1451 in contact with the ground terminal 1455 varies, and the resistance value of the sensing resistor 1452 through which power applied from the power supply unit (Vin) passes. Accordingly, a resistance value of the output resistor detected by the detecting unit also varies. Based on the resistance value of the output resistor detected by the detecting unit, the controller may determine the position of the sensing terminal 1451 in contact with the ground terminal 1455. Further, the controller may calculate the position of the second frame 102 on the first frame 101 based on the determined position of the sensing terminal 1451.

Since the area of the portion of the flexible display unit 151 located on the front face varies based on the position of the second frame 102, the size of the video output on the flexible display unit 151 may be adjusted based on the position of the second frame 102.

When the second frame 102 automatically moves using the driving unit, the second frame 102 may be controlled to stop at a position corresponding to the first state or the second state by adjusting the speed of the motor of the driving unit. The sensing terminal 1451 may be added to control the second frame 102 to stop at an intermediate state between the first state and the second state.

Figure 10:
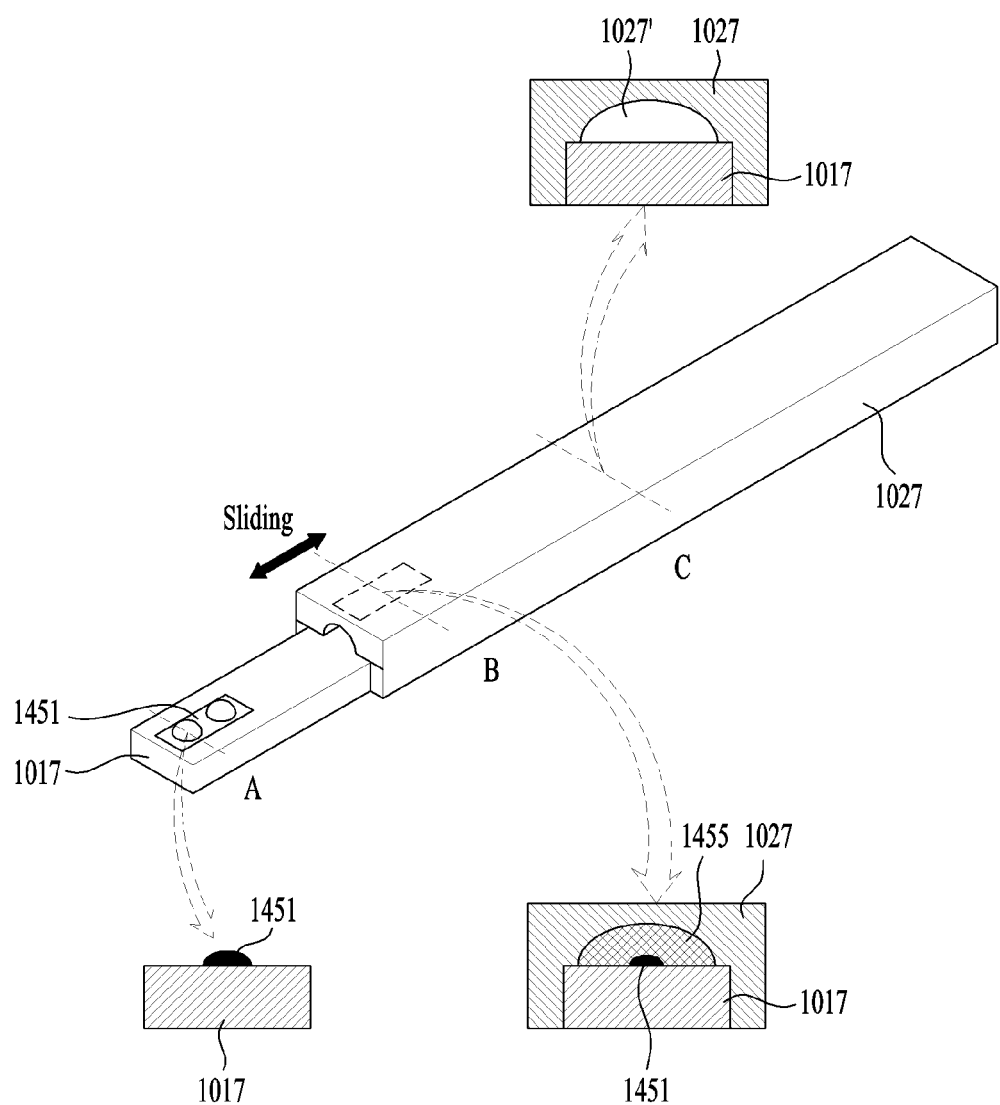
FIG. 10 is a view illustrating a connection scheme of a sensing unit.

FIG. 10 is a view illustrating cross-sections of the sensing unit 145 depending on positions of the sensing unit 145. Only the sensing terminal 1451 located in a portion A. The sensing terminal 1451 may have a pogo pin shape. When being in contact with the ground terminal 1455, the pogo pin may be withdrawn into the slide rail 1017, as in a portion B.

As shown in FIG. 10, the slidably-moving portion 1027 may define a groove 1027' extending in the first direction in a face facing a face where the sensing terminal 1451 is positioned, as shown in a portion C such that the slidably-moving portion 1027 does not come into contact with the sensing terminal 1451. A height of the groove 1027' may be greater than a height of the pogo pin, and the ground terminal 1455 may be disposed in the groove 1027'. The ground terminal 1455 may use a conductive gasket containing an elastic material to be in close contact with the pogo pin.

FIG. 11 is a diagram illustrating another embodiment of the sensing unit 145 of the mobile terminal 100. The member that slidably moves when the state of the mobile terminal 100 of the present disclosure is changed may slidably move the display unit in addition to the second frame 102 in the first direction. The flexible display unit 151 has the fixed portion fixed to the first frame 101 and the variable portion rolled in the second frame 102 and changed in size at the front face and the rear face. An end of the variable portion is coupled with the third frame 103 which slidably moves on the rear face of the second frame 102, and moves on the rear face of the second frame 102.

The sensing unit 145 may detect the state change based on the position change between the second frame 102 and the flexible display unit 151. When the second frame 102 moves by d relative to the first frame 101, the end of the variable portion or the third frame 103 moves by d with respect to the second frame 102, and as a result, the same result as in the above-described embodiment may be obtained.

The slide rail 1026 may be formed on the second frame 102, and the slidably-moving portion 1455 that moves along the slide rail 1026 of the second frame 102 may be positioned on the flexible display. Since the bending deflection occurs in the portion of the variable portion moving between the front face and the rear face, and thus, it is hard to implement the slidably-moving portion, the slidably-moving portion of the present embodiment may be positioned at the end of the variable portion of the flexible display unit 151. The third frame 103 located at the end of the variable portion may include the slidably-moving portion.

The flexible display unit 151 may include a curved display panel 1511 for outputting the video and a back plate 1512 for supporting a rear face of the display panel 1511. As the curved display panel 1511, an OLED panel or a panel using micro LEDs may be used, and the back plate 1515 may be a thin plate member of a metal member supporting a weak display panel. Since the back plate 1512 has a large area, the back plate 1512 may serve as a ground. The back plate 1512 of the flexible display unit 151 may be used to ground the ground terminal located in the slidably-moving portion.

FIG. 11 illustrates only portions of the flexible display unit 151 because it is difficult to illustrate an entirety of the flexible display unit 151.

As shown in FIG. 11(*a*), the sensing terminal 1451 and the ground terminal 1455 may be arranged on a face where the slide rail 1029 and the flexible display unit 151 face each other. However, as shown in FIG. 11(*b*), the sensing terminal 1451 may be disposed on a side face of the slide rail 1029, and the ground terminal 1455 extending from the rear face of the flexible display unit 151 may be provided.

The sensing resistor 1452 and the input resistor 1453 may be implemented using the flexible substrate 1454, and the sensing terminal 1451 connected to the sensing resistor 1452 may be mounted on a surface of the flexible substrate 1454. The sensing terminal 1451 may be in the form of the pogo pin as described above, or may be in a form of an electrode of a conductive material exposed on the surface of the general flexible display unit 151.

As described above, the applying of the load on the terminal may be prevented by stopping the driving unit 200 at a time when the state conversion of the mobile terminal 100 is completed using an optical detection sensor 1460 and markers 1461, 1462, and 1463. In addition, the plurality of driving units 200 may be synchronized with each other and move the second frame 102 at a uniform speed, thereby reducing defects occurring during the state conversion.

The mobile terminal that detects the moved distance of the frame and controls the driving unit to move the frame stably without the distortion may be provided. In addition, since the size of the video output on the display unit may be accurately adjusted, usability may be improved.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a first frame;
   a second frame movable with respect to the first frame in a first direction or in a second direction opposite to the first direction;
   a slide rail extendable in the first direction on the first frame;
   a slidably-moving portion coupled to the second frame and movable along the slide rail;
   a sensing terminal located on the slide rail;
   a sensing resistor connected to the sensing terminal;
   an input resistor positioned between a power supply unit and the sensing resistor;
   a detecting unit configured to measure a voltage between the sensing resistor and the input resistor;
   a ground terminal located on the slidably-moving portion; and
   a controller configured to determine a position of the second frame based on the voltage measured by the detecting unit when the ground terminal is in contact with the sensing terminal.

2. The mobile terminal of claim 1, wherein the slidably-moving portion includes a recessed groove at a side facing the slide rail, and
   wherein the ground terminal is located above the recessed groove and in contact with the slide rail.

3. The mobile terminal of claim 1, wherein the ground terminal includes a conductive gasket made of an elastic material.

4. The mobile terminal of claim 1, further comprising:
   a flexible substrate comprising the sensing resistor, wherein the input resistor is formed on the flexible substrate,
   wherein the sensing terminal is mounted on the flexible substrate and connected with the sensing resistor.

5. The mobile terminal of claim 1, wherein the sensing terminal includes a pogo pin having elasticity.

6. The mobile terminal of claim 1, further comprising:
   a plurality of sensing terminals arranged in the first direction along the slide rail; and
   a plurality of sensing resistors respectively connected to the plurality of sensing terminals,
   wherein each of the plurality of sensing resistors has a different resistance value.

7. A mobile terminal comprising:
   a first frame;
   a second frame movable with respect to the first frame in a first direction or in a second direction opposite to the first direction;
   a flexible display unit including a fixed portion coupled to the first frame and a variable portion extendable in the first direction, wherein the flexible display unit is bent in a direction of a side of the second frame;
   a slide rail extendable in the first direction on the second frame;
   a sensing terminal located on the slide rail;
   a sensing resistor connected to the sensing terminal;
   an input resistor positioned between a power supply unit and the sensing resistor;
   a detecting unit configured to measure a voltage between the sensing resistor and the input resistor;
   a ground terminal coupled to a side of the flexible display unit; and
   a controller configured to determine a position of the second frame based on the voltage measured by the detecting unit when the ground terminal is in contact with the sensing terminal.

8. The mobile terminal of claim 7, wherein the flexible display unit includes:
   a display panel for outputting a video; and
   a back plate for supporting a side of the display panel and containing a metal material, and
   wherein the ground terminal is connected to the back plate.

9. The mobile terminal of claim 7, further comprising:
   a third frame coupled to an end of the variable portion and movable in the first direction along the slide rail on the side of the second frame, and
   wherein the ground terminal is located on the second frame.

10. The mobile terminal of claim 7, wherein the sensing terminal is located on a side of the slide rail, and
    wherein the ground terminal is extendable vertically from the flexible display unit.

* * * * *